(12) United States Patent
Xu et al.

(10) Patent No.: US 11,010,241 B2
(45) Date of Patent: May 18, 2021

(54) TRANSLATION PROTECTION IN A DATA PROCESSING APPARATUS

(71) Applicant: Arm Limited, Cambridge (GB)

(72) Inventors: Zheng Xu, Austin, TX (US); Abdul Ghani Kanawati, Austin, TX (US); Viswanath Chakrala, Sheffield (GB)

(73) Assignee: Arm Limited, Cambridge (GB)

(*) Notice: Subject to any disclaimer, the term of this patent is extended or adjusted under 35 U.S.C. 154(b) by 11 days.

(21) Appl. No.: 16/243,168

(22) Filed: Jan. 9, 2019

(65) Prior Publication Data
US 2020/0218598 A1 Jul. 9, 2020

(51) Int. Cl.
*G06F 11/10* (2006.01)
*G06F 12/10* (2016.01)
(Continued)

(52) U.S. Cl.
CPC .......... *G06F 11/1004* (2013.01); *G06F 12/10* (2013.01); *G06F 11/00* (2013.01);
(Continued)

(58) Field of Classification Search
CPC .... G06F 11/00; G06F 12/10; G06F 2212/657; G06F 2212/68; G06F 2212/7201;
(Continued)

(56) References Cited

U.S. PATENT DOCUMENTS

2012/0066568 A1 3/2012 Komagome
2012/0246387 A1* 9/2012 Kanno ................ G06F 11/1016
711/103

(Continued)

FOREIGN PATENT DOCUMENTS

EP     2 620 875     7/2013

OTHER PUBLICATIONS

International Search Report and Written Opinion of the International Searching Authority for PCT/GB2019/053189 dated Feb. 24, 2020, 13 pages.

*Primary Examiner* — April Y Blair
*Assistant Examiner* — Sazzad Hossain
(74) *Attorney, Agent, or Firm* — Nixon & Vanderhye P.C.

(57) ABSTRACT

An apparatus and method of operating the apparatus are disclosed, where the apparatus has translation circuitry to perform translations of input data to generate a translation response comprising translated data. The translation is performed in dependence on translation configuration data stored in data storage. A processing element determines an associated error detection code in dependence on the input data and on the translated data, and causes the translation configuration data and the associated error detection code to be stored in the data storage. When translation of the input data is performed by the translation circuitry the translation configuration data and its associated error detection code are retrieved from the data storage and the input data is translated into the translated data in dependence on the translation configuration data. A verification error detection code is calculated in dependence on the input data and on the translated data. A difference between the associated error detection code and the verification error detection code triggers an error in the translation response.

14 Claims, 6 Drawing Sheets

(51) Int. Cl.
*G06F 11/00* (2006.01)
*G06F 11/16* (2006.01)
*G06F 12/14* (2006.01)
*G06F 11/07* (2006.01)
*G06F 13/40* (2006.01)

(52) U.S. Cl.
CPC ........ *G06F 11/0772* (2013.01); *G06F 11/167* (2013.01); *G06F 12/145* (2013.01); *G06F 13/404* (2013.01); *G06F 2212/1032* (2013.01); *G06F 2212/403* (2013.01); *G06F 2212/466* (2013.01); *G06F 2212/657* (2013.01); *G06F 2212/68* (2013.01); *G06F 2212/7201* (2013.01)

(58) Field of Classification Search
CPC .. G06F 11/0772; G06F 13/404; G06F 11/167; G06F 12/145; G06F 2212/403; G06F 2212/466; G06F 11/1004; G06F 2212/1032
See application file for complete search history.

(56) References Cited

U.S. PATENT DOCUMENTS

| | | | |
|---|---|---|---|
| 2013/0104013 A1* | 4/2013 | Nakaide | G06F 11/1004 714/807 |
| 2014/0282501 A1* | 9/2014 | Zeng | G06F 9/45545 718/1 |
| 2018/0067866 A1* | 3/2018 | Shanbhogue | G06F 9/45558 |

* cited by examiner

TRANSLATION PROTECTION IN A DATA PROCESSING APPARATUS

TECHNICAL FIELD

The present disclosure relates to data processing. In particular, the present disclosure relates to data processing involving translation of input data into translated data.

DESCRIPTION

A data processing apparatus may be required to perform a translation of input data into translated data in a variety of contexts. Furthermore, it may be essential to the operation of the data processing apparatus that this translation is performed in an error-free manner. To take just one example, a data processing apparatus may perform a translation of a source address in one addressing scheme into a translated address in a second addressing scheme, such as is the case when a memory management unit translates virtual addresses used by a processing unit into physical addresses used by a data storage component such as a memory.

The need for such a translation to be error-free may be particularly critical in certain contexts, such as where the data processing apparatus is responsible for human safety, such as is the case when the data processing apparatus controls an element of an automobile. In such safety-critical contexts, system designers have previously resorted to redundancy-based techniques, such as dual-core-lock-step (DCLS) to achieve the very high fault detection rates required by such safety-critical applications. However, such spatial redundancy is naturally expensive in terms of its additional area and power overhead, and as requirements for such data processing systems grow in terms of their required performance and features, such spatial redundancy techniques become less attractive.

SUMMARY

In one example embodiment described herein there is an apparatus comprising: a processing element to perform data processing operations, wherein performance of the data processing operations comprises issuing translation requests comprising input data; translation circuitry responsive to a translation request comprising input data to perform a translation of the input data to generate a translation response comprising translated data; and data storage to store translation configuration data, wherein the translation is performed by the translation circuitry in dependence on the translation configuration data, wherein the processing element is capable of determining an associated error detection code in dependence on the input data and on the translated data and is capable of causing the translation configuration data and the associated error detection code to be stored in the data storage, wherein the translation circuitry is responsive to the translation request to retrieve the translation configuration data and the associated error detection code from the data storage, wherein the translation circuitry is responsive to the translation configuration data and the associated error detection code retrieved from the data storage to perform the translation of the input data into the translated data in dependence on the translation configuration data and to determine a verification error detection code in dependence on the input data and on the translated data, and wherein the translation circuitry is responsive to a difference between the associated error detection code and the verification error detection code to signal an error in the translation response.

In one example embodiment described herein there is a method of operating a data processing apparatus comprising: performing data processing operations, wherein performance of the data processing operations comprises issuing translation requests comprising input data; in response to a translation request comprising input data, performing a translation of the input data to generate a translation response comprising translated data; storing translation configuration data in data storage of the data processing apparatus, wherein the translation is performed in dependence on the translation configuration data; determining an associated error detection code in dependence on the input data and on the translated data; causing the translation configuration data and the associated error detection code to be stored in the data storage; retrieving the translation configuration data and the associated error detection code from the data storage in response to the translation request; in response to the translation configuration data and the associated error detection code retrieved from the data storage, performing the translation of the input data into the translated data in dependence on the translation configuration data and determining a verification error detection code in dependence on the input data and on the translated data; and in response to a difference between the associated error detection code and the verification error detection code, signalling an error in the translation response.

In one example embodiment described herein there is an apparatus comprising: means for performing data processing operations, wherein performance of the data processing operations comprises issuing translation requests comprising input data; means for performing a translation of input data in response to a translation request comprising the input data to generate a translation response comprising translated data; means for storing translation configuration data, wherein the translation is performed in dependence on the translation configuration data; means for determining an associated error detection code in dependence on the input data and on the translated data; means for causing the translation configuration data and the associated error detection code to be stored in the means for storing; means for retrieving the translation configuration data and the associated error detection code from the means for storing in response to the translation request; means for performing the translation of the input data into the translated data, in response to the translation configuration data and the associated error detection code retrieved from the data storage, in dependence on the translation configuration data; means for determining a verification error detection code in dependence on the input data and on the translated data; and means for signalling an error in the translation response in response to a difference between the associated error detection code and the verification error detection code.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided an apparatus comprising: a processing element to perform data processing operations, wherein performance of the data processing operations comprises issuing translation requests comprising input data; translation circuitry responsive to a translation request comprising input data to perform a translation of the input data to generate a translation response comprising translated data; and data storage to store translation configuration data, wherein the translation is performed by the translation circuitry in dependence on the translation configuration data, wherein the processing element is capable of determining an associated error detection code in dependence on the input data and on the translated data and is capable of causing the translation configuration data and the associated error detection code to be stored in the data storage, wherein the translation circuitry is responsive to the translation request to retrieve the translation configuration data and the associated error detection code from the data storage, wherein the translation circuitry is responsive to the translation configuration data and the associated error detection code retrieved from the data storage to perform the translation of the input data into the translated data in dependence on the translation configuration data and to determine a verification error detection code in dependence on the input data and on the translated data, and wherein the translation circuitry is responsive to a difference between the associated error detection code and the verification error detection code to signal an error in the translation response.

The apparatus comprises translation circuitry which receives input data and translates this into translated data in dependence on translation configuration data. This translation configuration data is retrieved by the translation circuitry from data storage. This enables the translation circuitry to perform a wide variety of translations, by retrieving the appropriate translation configuration data for the translation which it must perform at any given moment. However, the present techniques recognise that the storage of the translation configuration data in the data storage and the requirement to retrieve the translation configuration data from that data storage represents an opportunity for errors to occur, whether as part of the storage process or as part of the transmission process. Whilst error detection codes could be generated on the basis of the translation configuration data in order to protect its integrity in transmission and in storage, the present techniques recognise that even this approach has vulnerabilities in that both the translation configuration data and the error detection code itself could potentially suffer a variation either in transmission or in storage.

To address this the present techniques propose an approach according to which, when the translation configuration data is caused to be stored in the data storage the processing element which controls this process also has access to the input data and the translated data and an error detection code is generated in dependence on both the input data and on the translated data. Accordingly, later when the translation circuitry receives the translation configuration data from the data storage together with its associated error detection code, it can firstly use the translation configuration data to translate the input data into the translated data, and can then use the input data and the translated data to regenerate the error detection code in order to verify if this produces the same output as the retrieved error detection code itself. If a difference between the retrieved error detection code and this verification error detection code is identified then an error can be generated in the translation response of the translation circuitry.

Whilst the present techniques are based on the translation of input data into translated data and the use of both the input data and the translated data as the basis for a function which generates the error detection code, it is recognised that further information may be available to the processing element when generating the associated error detection code and causing this to be stored with the translation configuration data in the data storage, which may also be available at the later translation by the translation circuitry. This provides the opportunity for this further information to also form part of the basis of the associated error detection code. Accordingly, in some embodiments the translation request further comprises input attribute information associated with the input data and the translation response further comprises translated attribute information associated with the translated data, wherein the processing element is capable of determining the associated error detection code in further dependence on the input attribute information and the translated attribute information, and wherein the translation circuitry is capable of determining the verification error detection code in further dependence on the input attribute information and the translated attribute information.

The input attribute information may take a variety of forms but in some embodiments the input attribute information comprises a source identifier indicative of a source of the translation request.

Further steps may also be taken according to the present techniques to protect the transmission of the associated error detection code when it is retrieved from the data storage and accordingly in some embodiments the translation circuitry is responsive to the translation request to cause a parity bit to be generated by the data storage in dependence on the associated error detection code, and to cause the parity bit to accompany the associated error detection code retrieved from the data storage. Thus modification of the associated error detection code in transmission from the data storage to the translation circuitry may be detected by a parity calculation on the basis of the associated error detection code and comparison to this parity bit.

The above described techniques may not only be used for the protection of the storage of the translation configuration data in the data storage and transmission thereof to the translation circuitry, but also in one or more further stages within or beyond the translation circuitry and for this purpose the translation circuitry may be configured to recalculate an error detection code on the basis of the input data, the translated data, and the associated error detection code to generate a further error detection code which may be used for protection of the translation circuitry response. Accordingly, in some embodiments the translation circuitry is further capable of determining a further error detection code in dependence on the input data, on the translated data, and on the associated error detection code, and wherein the translation response further comprises the further error detection code.

For example where the processing element is the recipient of the translation response from the translation circuitry the processing element may recalculate this further error detection code itself in order to verify the transmission of the translation response from the translation circuitry to the processing element. Accordingly, in some embodiments the processing element is responsive to the translation response to determine a further verification error detection code in dependence on the input data and on the translated data, and wherein the processing element is capable of determining a difference between the verification error detection code and the further error detection code.

The translation circuitry may perform virtual address to physical address translations, and this translation may be performed in two stages, namely in a first stage of virtual address (VA) to intermediate physical address (IPA) translation, followed by a second stage of intermediate physical address (IPA) to physical address (PA) translation. In this example the associated error detection code stored in the data storage can correspond to both the stage 1 VA to IPA translation and to the stage 2 IPA to PA translation. Hence the full VA to PA translation be checked by regenerating an associated error detection code based on data retrieved for both the stage 1 and the stage 2 translations.

The present techniques may find applicability in a range of context where translation is required, but in some embodiments the translation circuitry is associated with a memory management unit, wherein the input data is a first-addressing-scheme address and the translated data is a second-addressing-scheme address.

Such a memory management unit may be arranged to directly translate for example from a virtual address scheme to a physical address scheme. In other examples where the memory management unit is a system memory management unit there may be first and second stage address translations to be carried out, i.e. from a virtual address to an intermediate physical address, and then from an intermediate physical address to a physical address. Accordingly, in some embodiments, the input data is a virtual address and the translated data is an intermediate physical address. In other embodiments the input data is an intermediate physical address and the translated data is a physical address.

It will be understood therefore that when the translation circuitry is a memory management unit the translation configuration data can correspond to a page table entry indicating the translation between a first address scheme and a second address scheme and, where there may be several different guests operating systems in the system with different page tables for each operating system, each operating system has its own context information (e.g. as a VMID) which may also form part of the translation.

The translation circuitry may however be found in other contexts and in some embodiments the translation circuitry is associated with an interrupt controller, wherein the input data comprises an interrupt identifier and the translated data comprises an interrupt response target address.

In other example embodiments the translation circuitry is associated with an stream controller, wherein the input data is a stream identifier and the translated data is virtual machine identifier.

It should be appreciated that there may be a variety of ways in which the processing element may calculate the error detection code. On the one hand this may depend on the nature of the definition of the error detection code itself and on the other hand it may depend on the capabilities of the processing element. For example, in some embodiments the processing element is capable of executing a software routine to determine the associated error detection code in dependence on the input data and on the translated data. Accordingly, the software routine will define the processing steps necessary for the calculation of the error detection code on the basis of the input data and the translated data.

Alternatively, the processing element may be provided with a bespoke capability to calculate error detection codes, such as in the example of an instruction (amongst the instruction set defined for the processing element) which takes specified inputs and causes (in hardware) an error detection code to be calculated. Accordingly in some embodiments the processing element is capable of executing instructions of a predetermined instruction set, wherein the predetermined instruction set comprises an error detection code generation instruction and the processing element is capable of executing the error detection code generation instruction to determine the associated error detection code in dependence on the input data and on the translated data.

In accordance with one example configuration there is provided a method of operating a data processing apparatus comprising: performing data processing operations, wherein performance of the data processing operations comprises issuing translation requests comprising input data; in response to a translation request comprising input data, performing a translation of the input data to generate a translation response comprising translated data; storing translation configuration data in data storage of the data processing apparatus, wherein the translation is performed in dependence on the translation configuration data; determining an associated error detection code in dependence on the input data and on the translated data; causing the translation configuration data and the associated error detection code to be stored in the data storage; retrieving the translation configuration data and the associated error detection code from the data storage in response to the translation request; in response to the translation configuration data and the associated error detection code retrieved from the data storage, performing the translation of the input data into the translated data in dependence on the translation configuration data and determining a verification error detection code in dependence on the input data and on the translated data; and in response to a difference between the associated error detection code and the verification error detection code, signalling an error in the translation response.

In accordance with one example configuration there is provided an apparatus comprising: means for performing data processing operations, wherein performance of the data processing operations comprises issuing translation requests comprising input data; means for performing a translation of input data in response to a translation request comprising the input data to generate a translation response comprising translated data; means for storing translation configuration data, wherein the translation is performed in dependence on the translation configuration data; means for determining an associated error detection code in dependence on the input data and on the translated data; means for causing the translation configuration data and the associated error detection code to be stored in the means for storing; means for retrieving the translation configuration data and the associated error detection code from the means for storing in response to the translation request; means for performing the translation of the input data into the translated data, in response to the translation configuration data and the associated error detection code retrieved from the data storage, in dependence on the translation configuration data; means for determining a verification error detection code in dependence on the input data and on the translated data; and means for signalling an error in the translation response in response to a difference between the associated error detection code and the verification error detection code.

Particular embodiments will now be described with reference to the figures.

Figure 1:
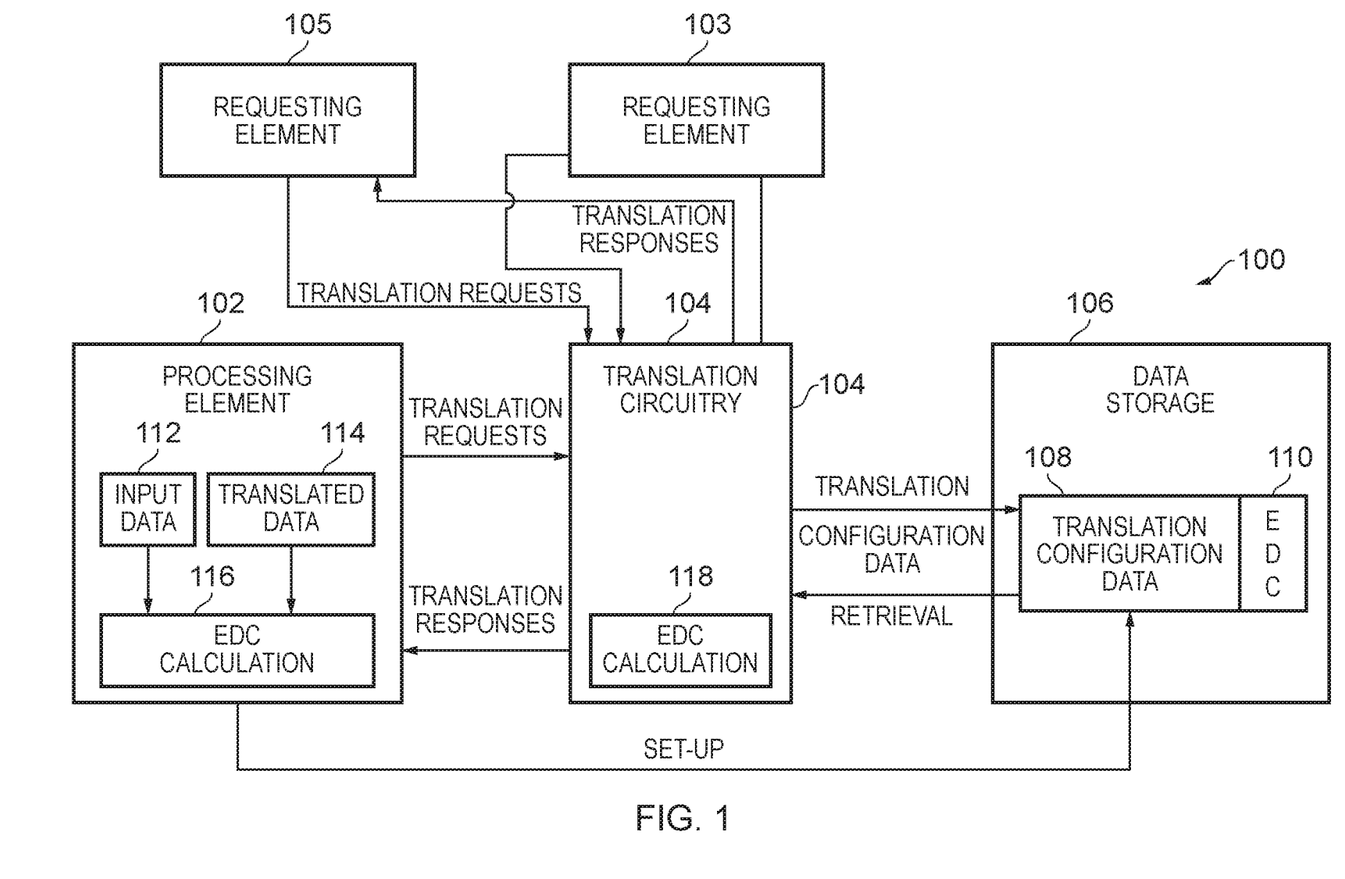
FIG. 1 schematically illustrates an apparatus in one example embodiment.

FIG. 1 illustrates a data processing apparatus 100 in accordance with one embodiment. The apparatus comprises processing element 102, translation circuitry 104, and data storage 106. For example, the processing element 102 may be a CPU, the translation circuitry 104 may be a memory management unit (MMU), and the data storage 106 may be DRAM accessed by the CPU. As part of the data processing operations which it performs, the processing element 102 requires certain data to be translated. These translations are performed on behalf of the processing element 102 by the translation circuitry 104 and the processing element 102 issues a translation request to the translation circuitry 104, when such a translation is to be performed. The translation circuitry 104 performs the translation in a manner which has been pre-defined by the processing element 102. FIG. 1 also shows requesting elements 103 and 105, which can also issue translation requests to the translation circuitry 104 and receive corresponding translation responses.

In an initial set-up phase the processing element 102 defines at least one translation which it will delegate to the translation circuitry 104 to perform on its behalf, and to do this the processing element 102 causes corresponding translation configuration data 108 to be stored in the data storage 106. The processing element 102 also sets up any translations which will be required by the requesting elements 103 and 105. Additionally, the processing element 1026, when determining the translation of configuration data 108 and causing it to be stored in the data storage 106, further determines a corresponding error detection code (EDC) 110 which is caused to be stored in association with the translation configuration data 108 in the data storage 106. In this initial set up stage when the processing element 102 defines the translation configuration data, the processing element 102 has both the input data 112 and the translated data 114 available to it. This thus enables the processing element 102 to define the necessary translation configuration data 108 to enable the input data 112 to be translated into the translated data 114, and furthermore the processing element 102 calculates the EDC on the basis of the both the input data 112 and the translated data 114. In FIG. 1 the processing element is shown as comprising EDC calculation unit 116, where it should be appreciated that the processing element may comprise dedicated hardware (i.e circuitry) for this purpose, or this may represent a logical component (i.e. capability) of the processing element.

Thus set up, in operation the processing element 102 issues translation requests to the translation circuity 104 comprising input data which it requires to be translated into translated data. To perform this translation, the translation circuitry 104 retrieves corresponding translation configuration data 108 from the data storage 106. The input data received from the processing element 102 is then translated, using the translation configuration data, into translated data. The translation circuitry 104 also causes the associated EDC to be retrieved from the data storage 106 when the translation configuration data is retrieved. Having translated the input data into translated data the translation circuitry 104 performs an EDC calculation 118 using the input data received from the processing element 102 and the translated data generated as a result of the translation which it has just performed as the inputs. The translation circuitry 104 then determines if the retrieved EDC and that which it has just calculated are the same. If they are then no error is detected and the translated data may be returned to the processing element 102 as the translation response. However, if the calculated EDC differs from that retrieved from the data storage then this is indicative of some kind of data corruption and a corresponding error may be signalled to the processing element 102 as the translation response.

Figure 2:
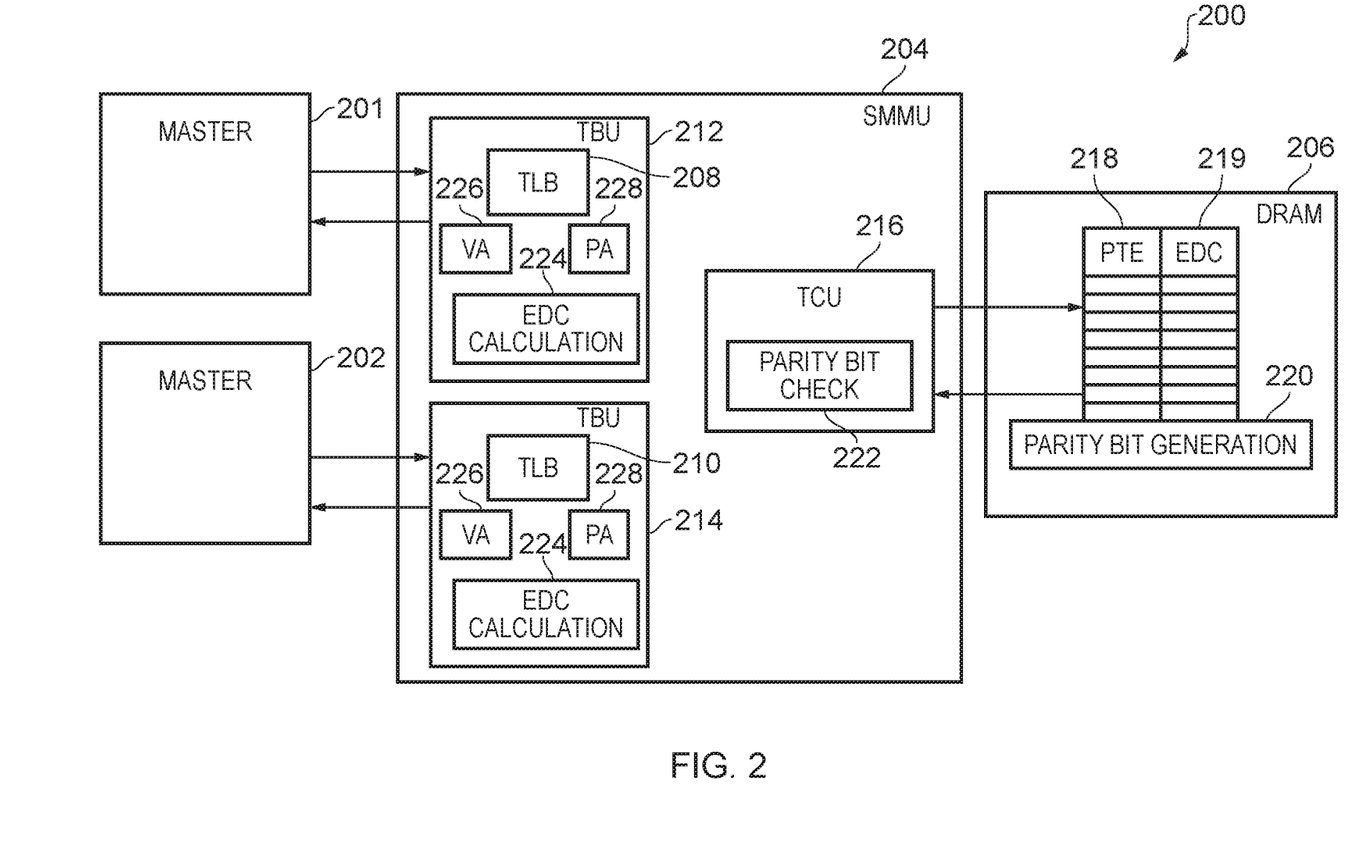
FIG. 2 schematically illustrates an apparatus comprising a memory management unit according to one example embodiment.

FIG. 2 schematically illustrates a data processing apparatus 200 in one example embodiment. The apparatus comprises two master devices 201 and 202, a system memory management unit (SMMU) 204, and a memory 206. In this example embodiment the memory 206 is a DRAM device. The function of the SMMU 204 is to provide address translations for the master devices 201 and 202. These address translations are defined by page table entries (PTE) stored in the memory. For simplicity here an example is described in which physical addresses are mapped to virtual addresses in these PTEs and may be retrieved by the SMMU by means of a hardware page table walk process. In fact the SMMU may perform these translations in two stages, namely in a first stage of virtual address (VA) to intermediate physical address (IPA) translation, followed by a second stage of intermediate physical address (IPA) to physical address (PA) translation. The techniques described herein may equally apply to either stage of translation.

A page table entry does not need to be accessed in memory every time the SMMU 204 is required to perform an address translation, since page table entries can be cached in the translation look aside buffers (TLBs) 208, 210 of the translation buffer units (TBU) 212, 214 in the SMMU 204. A translation control unit (TCU) 216 is provided to control the page table walk process when it is required to be carried out, i.e. when an address translation is required which is not currently cached in the TLBs. A TBU is provided for each of the masters. When a page table walk is carried out under control of the TCU 216, the required page table is accessed in memory 206 in order to retrieve the required page table entry 218 and its associated EDC 219. Additionally, the memory 206 comprises parity bit generation circuitry 220, which generates a parity bit as a function of input data and this parity bit accompanies the PTE 218 and EDC 219 which the memory 206 returns to the TCU 216. The TCU 216 itself comprise parity bit checking circuitry 222, which recalculates the parity bit on the basis of the PTE and EDC received. If the parity bit generated by the DRAM 206 and the parity bit generated by the TCU 222 differ then this indicates that some data corruption has occurred in transmission and this error may be reported. On receipt of the PTE 218 either of the TBUs 212, 214 can make use of its EDC calculation unit 224, whereby the virtual address which the TBU received as an input 226 and the physical address 228 which it has determined (with reference to the required PTE) are used as inputs to the EDC calculation unit 224. The TBU can then determine whether the retrieved EDC 219 and that calculated in the local calculation by the EDC calculation unit 224 are the same. If they are, then no data corruption is detected, whereas if they differ this is indicative of a data corruption and the TCU can signal this as part of the translation response.

As mentioned above the SMMU 204 may perform address translations in two stages, namely in a first stage of virtual address (VA) to intermediate physical address (IPA) translation, followed by a second stage of intermediate physical address (IPA) to physical address (PA) translation. When that is the case the associated error detection code stored in the data storage can correspond to both the stage 1 VA to IPA translation and to the stage 2 IPA to PA translation. Hence the full VA to PA translation be checked by regenerating an associated error detection code based on data retrieved for both the stage 1 and the stage 2 translations.

Figure 3A:
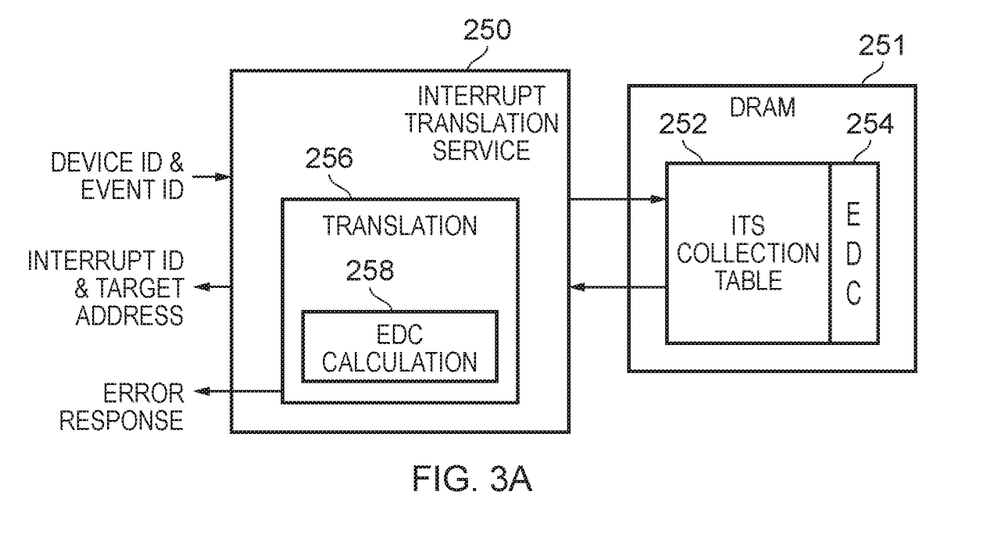
FIG. 3A schematically illustrates an apparatus comprising an interrupt translation service in one example embodiment.
Figure 3B:
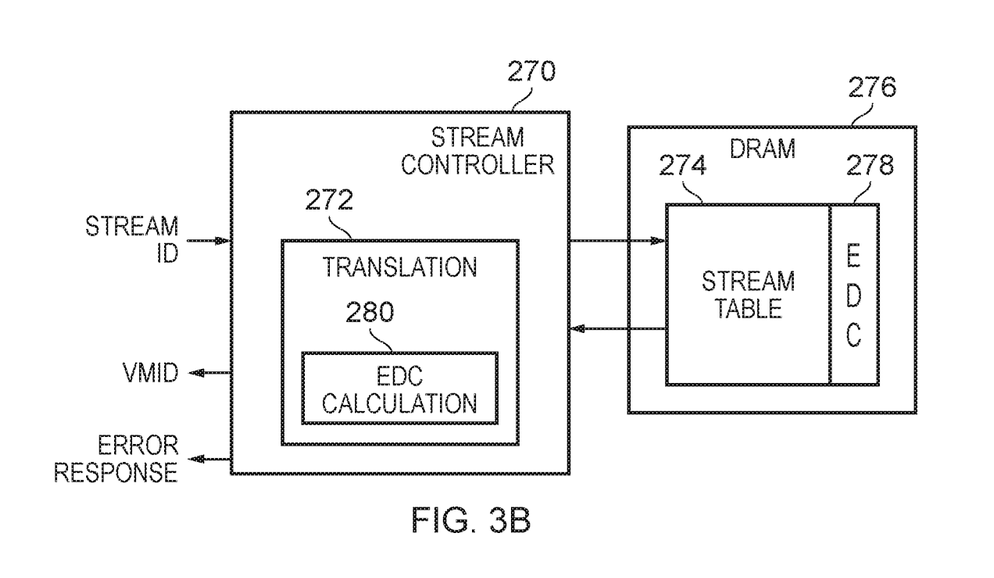
FIG. 3B schematically illustrates an apparatus comprising a stream controller in one example embodiment.

The present techniques find applicability in contexts other than that of address translation and FIG. 3A and FIG. 3B illustrate such example embodiments. For example, FIG. 3A schematically illustrates an interrupt translation services block 250, provided as circuity to support the response of a data processing apparatus to interrupts. For this purpose, the interrupt translation service 250 makes reference to an ITS collection table 252 stored in memory, which is provided in a set up phase by software in order to define interrupt identifiers and interrupt response target addresses for interrupt events for a number of different devices. In this set up phase, when defining the ITS collection table 252, the software also defines error detection codes (EDC) 254, calculated as a function of device ID, event ID, interrupt ID, and target address. Then, in operation, when the ITS 250 receives a device ID and event ID, its translation circuitry 256 references the ITS collection table 252 in order to translate these inputs into an interrupt ID and a target address. Having performed this translation, EDC calculation circuitry 258 of the translation circuitry 256 performs the EDC calculation again on the basis of the device ID and event ID which the ITS 250 has received as an input, and on the basis of the interrupt ID and target address which the translation circuitry 256 has retrieved with reference to the ITS collection table 252 in memory 251. If the retrieved EDC 254 and that calculated by the EDC calculation circuitry 258 are the same, then no corruption is identified. When the two EDC values differ, then the translation circuitry 256 can generate a corresponding error response for output.

Similarly, FIG. 3B schematically illustrates a stream controller 270, which is a hardware device arranged to perform a translation of a received stream identifier into a virtual machine identifier (VMID). This is performed by translation circuitry 272 of the stream controller 270 which references a stream table 274 stored in memory 276. In a set up phase, software defines the stream table 274 in memory and causes associated EDC values 278 to be stored in association therewith. Thus, when the translation circuitry 272 of the stream controller 270 retrieves a translation from the stream table 274 together with its associated EDC value, the translation circuitry 272 can make use of the stream ID and virtual machine identifier to recalculate the EDC value in its EDC calculation circuitry 280. When the retrieved and calculated EDC values are found to differ an error response is generated.

Figure 4A:
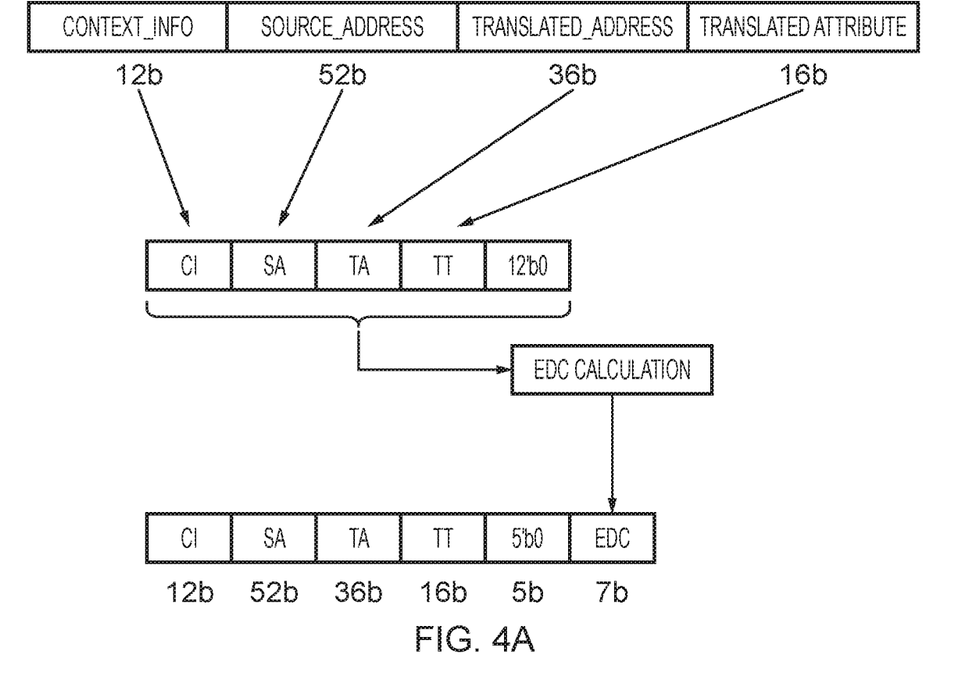
FIG. 4A schematically illustrates the use of a source address, a translated address, and additional attribute data to calculate an error detection code in one example embodiment.

Returning to the context of the example embodiment of FIG. 2, i.e. that of a SMMU, FIG. 4A schematically illustrates one configuration for the calculation of the error detection code (EDC). In this example each page table in memory has its own virtual machine identifier (VMID) associated with it, referred to in FIG. 4A as "CONTEXT_INFO". In this example a 64-bit system is considered, such that each page translation entry is 64-bit. There may be multiple levels of page table (e.g. L0-L3), where it is the entry at the last level which provides the page table entry (PTE) containing the required physical address and any corresponding attributes.

In this example of a 48-bit physical address PTE (noting that a physical address here may refer to a true physical address or an intermediate physical address), 36 bits are used to represent the physical address, 8 bits are used to represent access permissions, and a further 8 bits are used for transaction attributes (shareable, cacheable and so on). Note therefore that the SMMU 204 may support two stages of address translation. In such as case a first stage (Stage 1) is a translation from a virtual address (VA) to an intermediate physical address (IPA) within a guest operating system, which creates a page table set for each process, giving each a unique virtual address space, whilst at Stage 2 (i.e. intermediate physical address (ITA) to physical address (PA) translation) a hypervisor creates page tables for each guest operating system.

In this example of a 64-bit system, with a page size of 4 kB and 48 physical address bits, as shown in FIG. 4A: CONTEXT_INFO is 12 bits, the source address is represented in 52 bits, the translated address is represented in 36 bits, and the translated attributes are represented in 16 bits. This therefore means there are then 12 (spare) bits within two 64-bit words for additional information. In this example the EDC calculation is performed to generate a 7-bit error detection code value. Note that the error detection code value can take various forms and be various generated. For example it may be an ECC (error checking and correcting) value or may be a CRC (cyclical redundancy check) value.

Figure 4B:
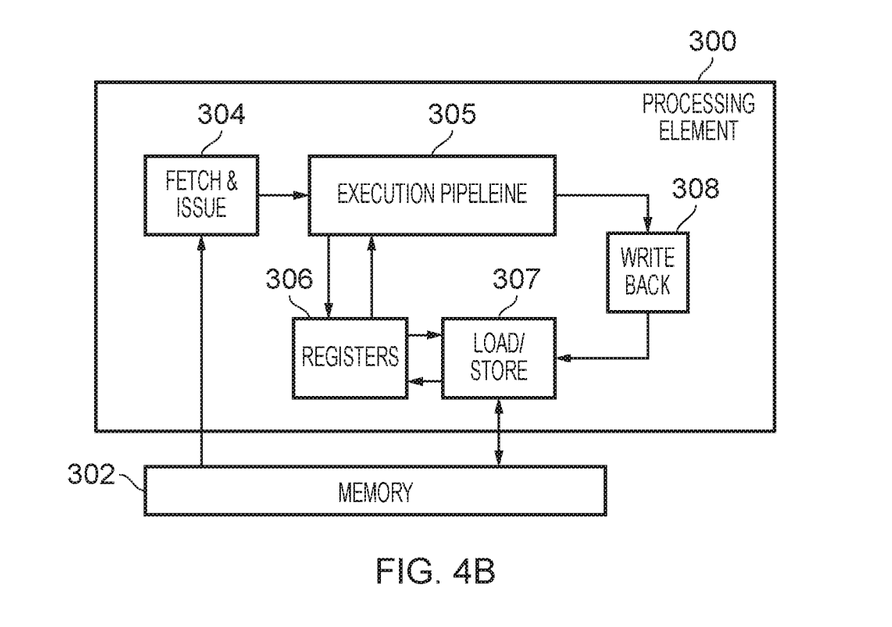
FIG. 4B schematically illustrates a processing element capable of executing instructions which may form part of an apparatus in one example embodiment.

When the processing element is required to calculate the EDC value, in some embodiments it may do so by executing a software routine which is provided for this purpose. In other embodiments the processing element may be configured such that among the instructions which it is capable of executing, a bespoke EDC calculation instruction is provided. The configuration of a processing element which is capable of executing defined instructions of an instruction set will be familiar to one of ordinary skill in the art. FIG. 4B schematically illustrates a high level view of such a processing element 300 associated with a memory 302. The processing element retrieves instructions from the memory 302 by means of fetch and issue unit 304, which passes instructions to the execution pipeline 305. These instructions cause operations to be performed by the execution pipeline with respect to values held in registers 306 and some cause data values to be loaded from memory into the registers 306 or stored from the registers 306 to memory by means of the load/store unit 307. Instructions which have completed execution in the execution pipeline 305 enter a write back stage 308 which may further cause certain data values to be updated in the register 306 and/or written out to memory 302 by means of the load/store unit 307. Amongst the instructions which the execution pipeline 305 is configured to execute an error detection code instruction is defined which specifies one or more input registers and one or more output registers and the error detection code calculated on the basis of the values of the input registers is caused to be written into the output register(s). Referring back to the example of FIG. 1, the EDC calculation capability 116 may be provided by the use of such an error detection code instruction.

Figure 5:
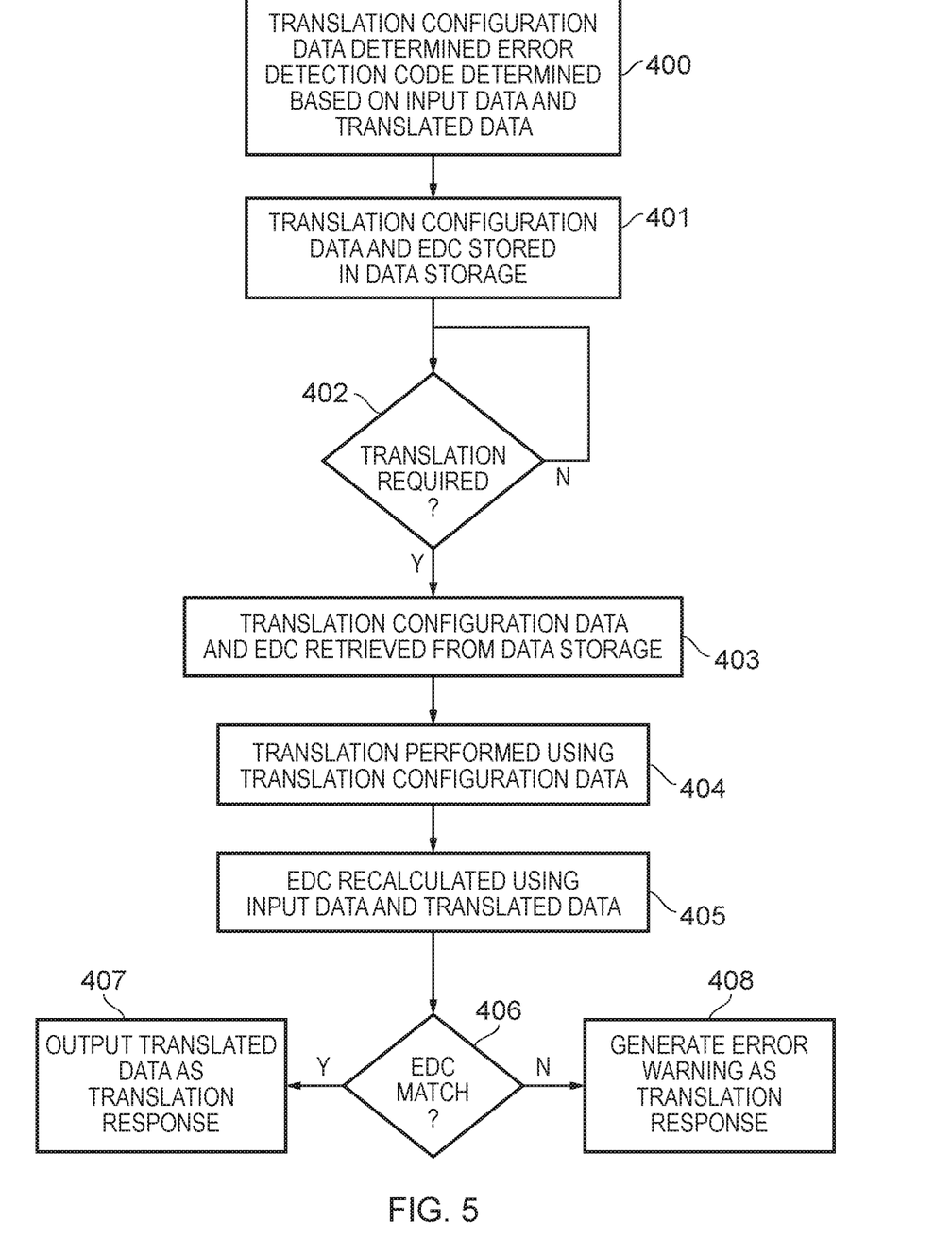
FIG. 5 is a flow diagram showing a sequence of steps which are taken according to the method of one example embodiment.

FIG. 5 is a flow diagram showing a sequence of steps which are taken according to the method of one embodiment. The illustrated steps begin with those of an initial set up phase, wherein at step 400 translation configuration data are determined (to allow input data to be translated into translated data) and error detection code value(s) is/are determined based on respective input data and translated data. Then at step 401 the translation configuration data and error detection code value(s) are stored in data storage. The flow then pauses at step 402 until a corresponding translation is required. Then the flow proceeds to step 403 where the translation configuration data and corresponding EDC value are retrieved from data storage to allow the translation to take place. The translation is then performed at step 404 using the translation configuration data. Then at step 405 an EDC value is recalculated using the input data and the translated data. It is then determined at step 406 if the EDC values match. If they do then the flow proceeds to step 407, where the translated data is output as the translation response. Conversely, if it is determined at step 406 that the EDC values differ, then at step 408 an error warning is generated as the translation response.

Figure 6:
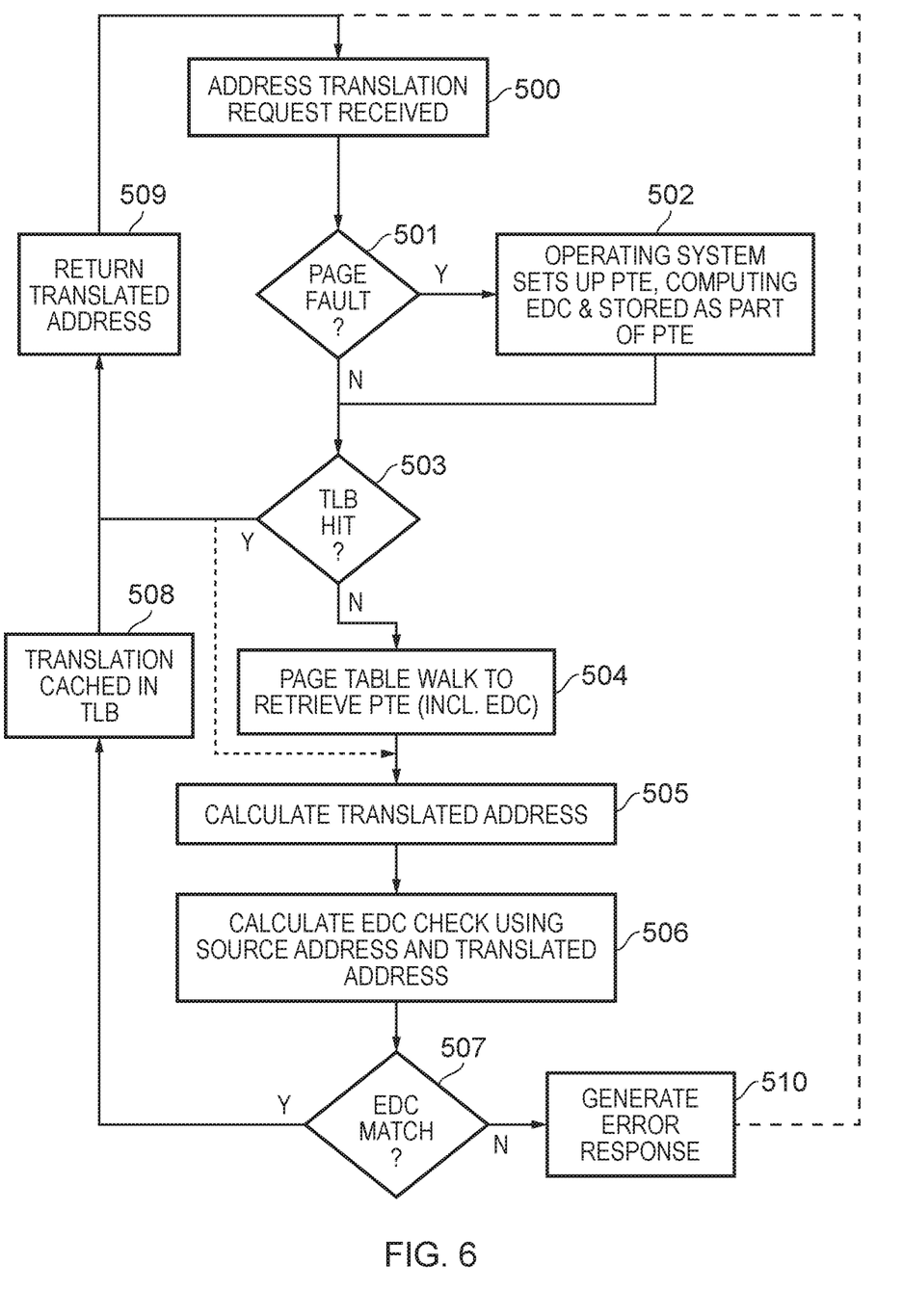
FIG. 6 is a flow diagram showing a sequence of steps which are taken according to the method of one example embodiment.

FIG. 6 shows a sequence of steps which are carried out in a data processing apparatus such as data processing apparatus 200 schematically illustrated in FIG. 2. The flow begins at step 500 where an address translation request is received by the SMMU 204. It is then determined at step 501 if a page fault has occurred as a result of the address translation request. A page fault will occur when the required page table to provide the translation required is not available in memory. Thus, when such a page fault occurs the flow proceeds to step 502 where the operating system sets up the required page table and page table entry, causing these to be stored in the memory 206, and calculating a corresponding EDC value, this being stored as part of the page table entry. It should be noted that it is further recognised here that the page fault could be erroneous. However the techniques described herein allow such errors also to be identified. For a false miss on a page fault, the techniques proposed herein can identify the error by means of the EDC applied to the input address/translated address (e.g. VA/PA) pair. For a false hit on a page fault, software (e.g. executing on the processing element 102 of FIG. 1) can double check whether the page fault is genuine by traversing the page table trying to set up the new PTE entry. By either route an erroneous page fault may be identified. From either step 501 (negative) or step 502 the flow then proceeds to step 503. At step 503 it is determined if a TLB hit has occurred (i.e. if the required translation is already available, cached in the TLB of the corresponding TBU). Without a TLB hit then the flow must proceed via step 504, where the TCU controls a page table walk process to retrieve the required page table entry (including its calculated EDC value) from memory. Then at step 505 the translated address is determined and at step 506 the EDC value is calculated using the source address and the translated address. It is then determined at step 507 if the EDC values match. If they do then the flow proceeds to step 508, where the translated address is cached in the TLB. Finally at step 509 the address translation is returned as the translation response. The flow then returns to step 500 for the next address translation request to be serviced. If however at step 507 it is determined that the EDC values do not match then at step 510 an error response is generated. The flow may then optionally proceed to return to step 500 for further address translation services to be provided, depending on the desired response to the error which has been identified. Returning to a consideration of step 503, when a TLB hit occurs the flow can proceed directly to step 509 for the address translation to be returned as the translation response. However the dashed path also indicates an alternative embodiment in which a more cautious approach is taken, wherein even when a TLB hit occurs the flow proceeds via step 505 and so on for the translated address to be determined, the EDC value to be calculated, and to determine if the EDC values match. This enables even to storage in and retrieval from the TLB to be monitored for the occurrence of errors.

In brief overall summary an apparatus and method of operating the apparatus are disclosed, where the apparatus has translation circuitry to perform translations of input data to generate a translation response comprising translated data. The translation is performed in dependence on translation configuration data stored in data storage. A processing element determines an associated error detection code in dependence on the input data and on the translated data, and causes the translation configuration data and the associated error detection code to be stored in the data storage. When translation of the input data is performed by the translation circuitry the translation configuration data and its associated error detection code are retrieved from the data storage and the input data is translated into the translated data in dependence on the translation configuration data. A verification error detection code is calculated in dependence on the input data and on the translated data. A difference between the associated error detection code and the verification error detection code triggers an error in the translation response.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Apparatus comprising:
    a processing element to perform data processing operations, wherein performance of the data processing operations comprises issuing translation requests comprising input data;
    translation circuitry responsive to a translation request comprising input data to perform a translation of the input data to generate a translation response comprising translated data; and
    data storage to store translation configuration data, wherein the translation is performed by the translation circuitry in dependence on the translation configuration data,
    wherein the processing element is capable of determining an associated error detection code in dependence on the input data and on the translated data and is capable of causing the translation configuration data and the associated error detection code to be stored in the data storage, wherein the translation circuitry is responsive to the translation request to retrieve the translation configuration data and the associated error detection code from the data storage, wherein the translation circuitry is responsive to the translation configuration data and the associated error detection code retrieved from the data storage to perform the translation of the input data into the translated data in dependence on the translation configuration data and to determine a verification error detection code in dependence on the input data and on the translated data, wherein the translation circuitry is responsive to a difference between the associated error detection code and the verification error detection code to signal an error in the translation response, and wherein the translation circuitry is responsive to the translation request to cause a parity bit different from the associated error detection code to be generated by the data storage in dependence on the associated error detection code, and to cause the parity bit to accompany the associated error detection code retrieved from the data storage.

2. The apparatus as claimed in claim 1, wherein the translation request further comprises input attribute information associated with the input data and the translation response further comprises translated attribute information associated with the translated data, wherein the processing element is capable of determining the associated error detection code in further dependence on the input attribute information and the translated attribute information, and wherein the translation circuitry is capable of determining the verification error detection code in further dependence on the input attribute information and the translated attribute information.

3. The apparatus as claimed in claim 2, wherein the input attribute information comprises a source identifier indicative of a source of the translation request.

4. The apparatus as claimed in claim 1, wherein the translation circuitry is further capable of determining a further error detection code in dependence on the input data, on the translated data, and on the associated error detection code, and wherein the translation response further comprises the further error detection code.

5. The apparatus as claimed in claim 4, wherein the processing element is responsive to the translation response to determine a further verification error detection code in dependence on the input data and on the translated data, and wherein the processing element is capable of determining a difference between the verification error detection code and the further error detection code.

6. The apparatus as claimed in claim 1, wherein the translation circuitry is associated with a memory management unit, wherein the input data is a first-addressing-scheme address and the translated data is a second-addressing-scheme address.

7. The apparatus as claimed in claim 6, wherein the input data is a virtual address and the translated data is an intermediate physical address.

8. The apparatus as claimed in claim 6, wherein the input data is an intermediate physical address and the translated data is a physical address.

9. The apparatus as claimed in claim 1, wherein the translation circuitry is associated with an interrupt controller, wherein the input data comprises an interrupt identifier and the translated data comprises an interrupt response target address.

10. The apparatus as claimed in claim 1, wherein the translation circuitry is associated with a stream controller, wherein the input data is a stream identifier and the translated data is virtual machine identifier.

11. The apparatus as claimed in claim 1, wherein the processing element is capable of executing a software routine to determine the associated error detection code in dependence on the input data and on the translated data.

12. The apparatus as claimed in claim 1, wherein the processing element is capable of executing instructions of a predetermined instruction set, wherein the predetermined instruction set comprises an error detection code generation instruction and the processing element is capable of executing the error detection code generation instruction to determine the associated error detection code in dependence on the input data and on the translated data.

13. A method of operating a data processing apparatus comprising:
performing data processing operations, wherein performance of the data processing operations comprises issuing translation requests comprising input data;
in response to a translation request comprising input data, performing a translation of the input data to generate a translation response comprising translated data;
storing translation configuration data in data storage of the data processing apparatus, wherein the translation is performed in dependence on the translation configuration data;
determining an associated error detection code in dependence on the input data and on the translated data;
causing the translation configuration data and the associated error detection code to be stored in the data storage;
retrieving the translation configuration data and the associated error detection code from the data storage in response to the translation request;
in response to the translation configuration data and the associated error detection code retrieved from the data storage, performing the translation of the input data into the translated data in dependence on the translation configuration data and determining a verification error detection code in dependence on the input data and on the translated data;
in response to a difference between the associated error detection code and the verification error detection code, signalling an error in the translation response; and
in response to the translation request, causing a parity bit different from the associated error detection code to be generated by the data storage in dependence on the associated error detection code, and causing the parity bit to accompany the associated error detection code retrieved from the data storage.

14. Apparatus comprising:
means for performing data processing operations, wherein performance of the data processing operations comprises issuing translation requests comprising input data;
means for performing a translation of input data in response to a translation request comprising the input data to generate a translation response comprising translated data;
means for storing translation configuration data, wherein the translation is performed in dependence on the translation configuration data;

means for determining an associated error detection code in dependence on the input data and on the translated data;

means for causing the translation configuration data and the associated error detection code to be stored in the means for storing;

means for retrieving the translation configuration data and the associated error detection code from the means for storing in response to the translation request;

means for performing the translation of the input data into the translated data, in response to the translation configuration data and the associated error detection code retrieved from the data storage, in dependence on the translation configuration data;

means for determining a verification error detection code in dependence on the input data and on the translated data;

means for signalling an error in the translation response in response to a difference between the associated error detection code and the verification error detection code; and means for causing, in response to the translation request, a parity bit different from the associated error detection code to be generated by the data storage in dependence on the associated error detection code, and the parity bit to accompany the associated error detection code retrieved from the data storage.

* * * * *